United States Patent [19]
de Klein

[11] 3,927,051

[45] Dec. 16, 1975

[54] PROCESS FOR THE PREPARATION OF AN UNSATURATED CARBOXYLIC ACID

[75] Inventor: Willem J. de Klein, Dieren, Netherlands

[73] Assignee: Akzo N.V., Arnhem, Netherlands

[22] Filed: Sept. 4, 1973

[21] Appl. No.: 394,267

[30] Foreign Application Priority Data
Sept. 8, 1972 Netherlands.................. 7212205

[52] U.S. Cl............. 260/413; 260/343; 260/514 M; 260/515 R; 260/533 N; 260/537 N
[51] Int. Cl.............................................. C08h 17/36
[58] Field of Search.......... 260/413, 514 M, 533 N, 260/537 N

[56] References Cited
UNITED STATES PATENTS

| | | | |
|---|---|---|---|
| 2,297,039 | 9/1942 | Van Melsen...................... | 260/537 |
| 3,054,814 | 9/1962 | Jason et al........................ | 260/413 |
| 3,076,842 | 2/1963 | Jason et al........................ | 260/533 |
| 3,247,249 | 4/1966 | Saffer............................... | 260/533 |
| 3,459,796 | 8/1969 | Duncanson et al. ............ | 260/533 R |
| 3,720,710 | 4/1973 | Norton et al.................... | 260/533 R |

FOREIGN PATENTS OR APPLICATIONS

| | | | |
|---|---|---|---|
| 1,219,332 | 1/1971 | United Kingdom................ | 260/413 |

*Primary Examiner*—Ethel G. Love
*Attorney, Agent, or Firm*—Stevens, Davis, Miller and Mosher

[57] ABSTRACT

A process for the preparation of an (ar)alkene carboxylic acid is disclosed wherein an (ar)alkene is reacted with a carbonyl compound having at least one hydrogen atom linked to the α-carbon atom in the presence of a polyvalent manganese compound which is at least trivalent and a bivalent copper compound. The presence of the latter compound will minimize or prevent undesired by-products of the reaction.

9 Claims, No Drawings

PROCESS FOR THE PREPARATION OF AN UNSATURATED CARBOXYLIC ACID

The invention relates to a process for the preparation of a carboxylic acid carried out by reacting an (ar)alkene in the presence of a manganese compound, which is at least trivalent, with a carbonyl compound having at least one hydrogen atom linked to the α-carbon atom.

The general process is described in British Patent Specification No. 1,219,332.

According to this process, if an (ar)alkene is reacted with a manganese compound which is at least trivalent, while using a mixture containing acetic acid and acetic anhydride, the main reaction products will be saturated carboxylic acids or lactones and acetoxycarboxylic acids, dependent on the reaction conditions applied.

The present invention has for its object to provide ethylenically unsaturated carboxylic acids, which are of importance, for instance, as additives in polymer compositions and as starting compounds for chemical syntheses.

The process according to the invention is characterized in that an (ar)alkene carboxylic acid is prepared in such a way that the reaction is carried out in the presence of a bivalent copper compound.

The (ar)alkene carboxylic acid is prepared by coupling the carbonyl compound with the (ar)alkene which eventually will give rise to the formation of a carboxylic acid, whose number of carbon atoms corresponds to the sum total of the numbers of the carbon atoms contained in the starting (ar)alkene and in the carboxylic acid from which the carbonyl compound has been derived.

A surprising advantage of the process according to the invention is that owing to the presence of the copper compound hardly any saturated carboxylic acids, γ-lactones or acetoxy-carboxylic acids will be formed; generally (ar)alkene carboxylic acids are obtained in a virtually quantitative yield.

Examples of copper compounds that may be used according to the invention are the salts of carboxylic acid such as copper formate, copper acetate, copper propionate, copper butyrate, copper laurate, copper myristate, copper palmitate, copper oleate, copper stearate, copper erucate, copper naphthenate and copper benzoate. Copper compounds such as copper chloride, copper bromide, copper sulphate, copper carbonate, copper chlorate, copper nitrate, copper phosphate, and copper borate are also useful. It is preferred to use the copper salt of the carboxylic acid derived from the carbonyl compound employed according to the process of the invention. The copper compound may contain water of crystallization, but this is not objectionable.

The bivalent copper compound may be formed in situ by the addition to the reaction medium of metallic copper or a monovalent copper compound. Mixtures of copper compounds, if desired in admixture with other dissolved or non-dissolved metal compounds are also applicable.

The copper compound is generally employed in the reaction medium in an amount in the range of $10^{-10}$ to 1 mole/l, and preferably of $10^{-4}$ to $10^{-2}$ moles/l. Concentrations higher than 1 mole/l may also be used, but offer no additional advantages.

The (ar)alkenes suitable to be used for carrying out the process according to the invention include cyclic or acyclic, substituted or non-substituted hydrocarbons containing one or more C=C bonds which do not form an aromatic ring system. The compounds may carry substituents such as a halogen atom, examples of which are chlorine and bromine; a cyano group, an alkoxy group or a methylene alkoxy group, an acetoxy group or a methylene acetoxy group and aryl groups which may or may not carry the aforementioned substituents.

Examples of suitable (ar)alkenes are olefins containing 2 to 24 carbons atoms such as ethylene, propylene, 1-butene, 2-butene, 3-methylbutene-1, 1-hexene, 1-octene, 1-dodecene, 2-dodecene, 1-hexadecene and 1-octadecene; cyclohexene, cyclooctene, 1,3-butadiene, 1,5-hexadiene, allylbenzene and unsaturated acids, such as $\Delta^9$-decylenic acid, oleic acid, linoleic acid, palmitoleic acid. The (ar)alkene concentration will generally not be higher than 40 moles/l; it is preferably in the range of $10^{-5}$ to 2 moles/l.

Concentrations higher than 2 moles/l will to an increasing extent give rise to the formation from the unsaturated (ar)alkene carboxylic acids of dimers and higher telomers.

The carbonyl compounds to be used for carrying out the process according to the invention include the carboxylic acids containing 2 to 25 carbon atoms, such as acetic acid, propionic acid, butyric acid, isobutyric acid, heptane carboxylic acid, phenylpropionic acid, stearic acid and erucic acid, or the mixed or non-mixed anhydrides thereof. The compounds may, of course, carry substituents, provided that the carbon atom which is in the alpha-position relative to the carbonyl group, contains at least one hydrogen atom. Suitable substituents are, for instance, halogen atoms such as fluorine, chlorine, bromine or iodine; nitro-groups, cyano groups and alkoxy or acetoxy groups. For practical reasons it is preferred to use the lower carboxylic acids such as acetic acid and isobutyric acid, whether or not combined with the anhydrides derived therefrom, because these acids can readily be isolated from the reaction mixture by distillation. Alternatively, use may be made of the esters derived from said carboxylic acids. It is preferred to use mixtures of a carboxylic acid and the carboxylic anhydride derived therefrom.

The ratio between the anhydride and the carboxylic acid is not critical. Usually the carbonyl compound(s) is (are) employed as reaction medium; however, also suitable are mixtures thereof with inert solvents such as paraffins.

The manganese compound, which must at least be trivalent, is generally employed in an amount in the range of $10^{-10}$ to 50 moles/l, but preferably of $10^{-7}$ to $10^{-1}$ moles/l, more particularly $10^{-4}$ to $10^{-3}$ moles/l. With the other conditions remaining unchanged, the use of a concentration higher than approximately $10^{-1}$ moles/l causes the formation of by-products to increase. It is preferred to use the manganese compound which is derived from the same carboxylic acid as used for building up the carbonyl compound(s). In this way, the formation of various mixed acid anhydrides is counteracted as much as possible and an end-product of maximum possible purity is obtained.

The temperature at which the process according to the invention may be carried out successfully varies from about 50° to about 250°C.

It is preferred that the temperature should be in the range of 70° to 200°C. The reaction is as a rule carried out at atmospheric pressure, but it may also take place in an autoclave at elevated pressure. The reaction may be carried out batch-wise, or in a semi-continuous or continuous process.

The process according to the invention may be carried out in one of several ways. The reaction components, after they have been intermixed, may gradually be heated to the desired temperature. Alternatively, the components may gradually and in proper sequence be introduced into the reactor which is kept at the desired temperature. Thus, the manganese compound and the alkene may gradually be added to the reaction mixture containing the copper compound and the carbonyl compound.

Example I

Manganese triacetate (23.2g), 22.4g of 1-octene and 1.7g of copper dichloride dihydrate were added to a mixture of 50 ml of acetic acid and 450 ml of acetic anhydride, followed by heating the resulting mixture at a temperature of 110°C in an atmosphere of nitrogen until the manganese triacetate has been converted. The mixture was then allowed to cool down to room temperature and the solid salts formed were filtered off. Acetic acid and acetic anhydride were removed from the filtrate by distillation.

Water and sulphuric acid were added to the residue, followed by ether extraction of the resulting mixture.

The ethereal layer was separated and the ether contained therein distilled off. The residue was heated under reflux for 2 hours with acetic acid. The resulting mixture of acetic acid and acetic anhydride was subsequently distilled off.

The resulting residue weighed 7.7 g and was shown by infra-red, nuclear magnetic resonance and gas-chromatografic analyses to be a mixture of $\Delta^4$-decylenic acid (46%), $\Delta^3$-decylenic acid (4%), telomer of the decylenic acid (39%), decanoic acid (1%), and decanolactone and $\gamma$-acetoxydecanoic acid (10%).

Example II

In an atmosphere of nitrogen a suspension of 23.2 g of manganese triacetate in 200 ml of acetic anhydride was, with proper stirring, added to a mixture of 300 ml of acetic anhydride, 22.4 g of n-octene and 1 g of copper diacetate monohydrate.

The rate at which the manganese acetate was added to the reaction mixture was such as to permit said mixture to remain light-green. The reaction mixture was then allowed to cool down to room temperature, the manganese salts and copper salts precipitating almost quantitatively, and filtered off. The acetic anhydride was removed from the resulting filtrate by distillation, followed by the addition to the residue of 100 mg of p-toluene sulphonic acid. The mixed anhydride present disproportionated, with heating, into the respective symmetric anhydrides, after which the acetic anhydride thus formed was distilled off.

An equivalent amount of water was added to the residue and heated to separate the decylenic acid. The resulting hydrolysate weighed 7.9 g and contained 67% of $\Delta^4$-decylenic acid, 5% of $\Delta^3$-decylenic acid, 25% of telomer of the decylenic acid and 3% of decanoic acid, but no decanolactone or $\gamma$-acetoxy acid.

Example III

Manganese triacetate (23.2 g), 22.4 g of 1-octene and 1g of copper diacetate monohydrate were added to a mixture of 250 ml of acetic acid and 250 ml of acetic anhydride, followed by heating the mixture thus obtained to a temperature of 110°C in an atmosphere of nitrogen until all of the manganese triacetate had been converted.

The reaction mixture was worked up in the manner described in Example I. The resulting residue weighed 9.5 g and contained 56% of $\Delta^4$-decylenic acid, 4% of $\Delta^3$-decylenic acid, 39% of telomer of the decylenic acid and 1% of decanoic acid. The residue was not found to contain decanolactone or $\gamma$-acetoxy acid.

Example IV

In an atmosphere of nitrogen 23.2 g of manganese triacetate in 200 ml of acetic anhydride and 10.5 g of 1-octene were successively added gradually to a mixture of 1 g of copper diacetate monohydrate and 300 ml of acetic anhydride which was kept at a temperature of 121°C.

The reaction mixture was worked up in the manner described in Example I. The residue was shown by gas-chromatographic examination to contain 60% of $\Delta^4$-decylenic acid and 1.5% of decanoic acid. It was not found to contain $\Delta^3$-decylenic acid.

The $\Delta^4$-decylenic acid was shown to exist mainly (about 80%) in the trans modification.

Example V

An autoclave fitted with a stirrer was washed with nitrogen and subsequently filled with a mixture of 1.0 g of cupric acetate monohydrate and 300 ml of acetic anhydride, after which the contents of the vessel was heated to a temperature of 120°C. To this mixture were gradually added 5.2 g of manganese triacetate in 200 ml of acetic anhydride and 100 g of ethene, the reaction temperature being kept at 120°C. After completion of the reaction the mixture was cooled down to room temperature and the manganese diacetate was filtered off.

The volatile constituents such as acetic anhydride and acetic acid were distilled off. The residue, which dissolved in ether, was concentrated by evaporation and subsequently dissolved in water, followed by the addition to it of a small amount of p-toluene sulphonic acid and heating for 1½ hours under reflux. By gas-chromatographic analysis the mixture was found to contain 3-butenoic acid and 2-butene-1,4dicarboxylic acid. In order to show the presence of the last-mentioned compound it was necessary for the mixture to be esterified.

Example VI

Manganese triacetate (23.2 g), 39.2 g of 1-tetradecene and 1 g of copper diacetate monohydrate in a mixture of 250 ml of acetic acid and 250 ml of acetic anhydride were heated to 120°C in a nitrogen atmosphere until all manganese triacetate had been converted. The reaction mixture was treated as described in Example I.

The resulting residue consisted mainly of $\Delta^4$-hexadecylenic acid.

What is claimed is:

1. A process for the preparation of an ethylenically unsaturated carboxylic acid comprising reacting an ethylenically unsaturated hydrocarbon with a lower carboxylic acid or anhydride thereof in the presence of a manganese compound which is at least trivalent and in the presence of a bivalent copper compound and hydrolyzing the thus obtained reaction product.

2. The process of claim 1 wherein said copper compound is a copper salt of the lower carboxylic acid.

3. The process of claim 1 wherein said copper compound is present in an amount of $10^{-10}$ to 1 mole/l.

4. The process of claim 2 wherein said copper compound is present in an amount of $10^{-10}$ to 1 mole/l.

5. The process of claim 1 wherein said ethylenically unsaturated compound is selected from the group consisting of ethylene, propylene, 1-butene, 2-butene, 3-methyl-butene-1, 1-hexene, 1-octene, 1-dodecene, 2-dodecene, 1-hexadecene, 1octadecene, cyclohexene, cyclo-octene, 1,3-butadiene, 1,5-hexadiene, allyl benzene.

6. The process of claim 1 wherein said manganese compound is manganese triacetate.

7. The process of claim 1 wherein said bivalent copper compound is selected from the group consisting of copper formate, copper acetate, copper propionate, copper butyrate, copper laurate, copper myristate, copper palmitate, copper oleate, copper stearate, copper erucate, copper naphthenate, copper benzoate, copper chloride, copper bromide, copper sulphate, copper carbonate, copper chlorate, copper nitrate, copper phosphate, and copper borate.

8. The process of claim 1 wherein said ethylenically unsaturated compound is present in an amount of $10^{-5}$ to 2 moles/l.

9. The process of claim 1 wherein said manganese compound is present in an amount of $10^{-10}$ to 50 moles/l.

* * * * *